United States Patent
Michaud (10) Patent No.: US 11,165,378 B2
(45) Date of Patent: Nov. 2, 2021

(54) METHOD FOR CONTROLLING A SYSTEM FOR GENERATING ELECTRIC POWER FOR A POWER DISTRIBUTION NETWORK OF AN AIRCRAFT

(71) Applicant: SAFRAN ELECTRICAL & POWER, Blagnac (FR)

(72) Inventor: Benoit Michaud, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 17/262,147

(22) PCT Filed: Jul. 10, 2019

(86) PCT No.: PCT/EP2019/068481
§ 371 (c)(1),
(2) Date: Jan. 21, 2021

(87) PCT Pub. No.: WO2020/020636
PCT Pub. Date: Jan. 30, 2020

(65) Prior Publication Data
US 2021/0313913 A1    Oct. 7, 2021

(30) Foreign Application Priority Data

Jul. 26, 2018   (FR) .................................. 1856988

(51) Int. Cl.
*H02P 9/10*   (2006.01)
*H02M 5/42*   (2006.01)
*B64D 41/00*  (2006.01)

(52) U.S. Cl.
CPC ................ *H02P 9/10* (2013.01); *B64D 41/00* (2013.01); *H02M 5/42* (2013.01); *B64D 2221/00* (2013.01)

(58) Field of Classification Search
None
See application file for complete search history.

(56) References Cited

U.S. PATENT DOCUMENTS

| 4,937,723 A | 6/1990 | Rozman et al. |
| 2007/0108771 A1 | 5/2007 | Jones et al. |

(Continued)

OTHER PUBLICATIONS

Search Report from French Intellectual Property Office on corresponding FR application (FR1856988) dated May 23, 2019.

(Continued)

*Primary Examiner* — Jared Fureman
*Assistant Examiner* — Aqeel H Bukhari
(74) *Attorney, Agent, or Firm* — Klein, O'Neill & Singh, LLP (57) ABSTRACT

A method for controlling a system for generating electric power for a power distribution network of an aircraft, the system for generating electric power comprising a generator, a rectifier, an inverter which produces a voltage according to several fixed-frequency phases, a DC voltage bus which connects the rectifier to the inverter, the control method comprising: —a correction step to determine at least one correction quantity GC, —a step of determining a signal SO for controlling the inverter from the determined correction quantity GC, —a step of determining a signal SG for controlling the generator from the determined correction quantity GC and —a step of transmitting the control signals SO, SG to the inverter and to the generator, respectively.

9 Claims, 5 Drawing Sheets (56) References Cited

U.S. PATENT DOCUMENTS

| | | | | |
|---|---|---|---|---|
| 2010/0252688 | A1* | 10/2010 | Koeppen | ............... F02N 11/006 244/53 A |
| 2012/0001481 | A1* | 1/2012 | Koeppen | ................. H02J 9/062 307/9.1 |
| 2017/0309090 | A1 | 10/2017 | Taketomi et al. | |

OTHER PUBLICATIONS

International Search Report and Written Opinion on corresponding PCT application (PCT/EP2019/068481) from International Searching Authority (EPO) dated Sep. 19, 2019.

* cited by examiner

FIGURE 9

METHOD FOR CONTROLLING A SYSTEM FOR GENERATING ELECTRIC POWER FOR A POWER DISTRIBUTION NETWORK OF AN AIRCRAFT

TECHNICAL FIELD

The present invention relates to the field of the electric power supply of an aircraft and, more particularly, an electric power generation system from mechanical torque received by a turbomachine of the aircraft.

Traditionally, an aircraft turbomachine comprises an accessory gear box, known to those skilled in the art by its acronym AGB, which makes it possible to take mechanical power from a shaft of the turbomachine to convert it into electric energy in order to supply an electrical distribution network of the aircraft.

Figure 1:
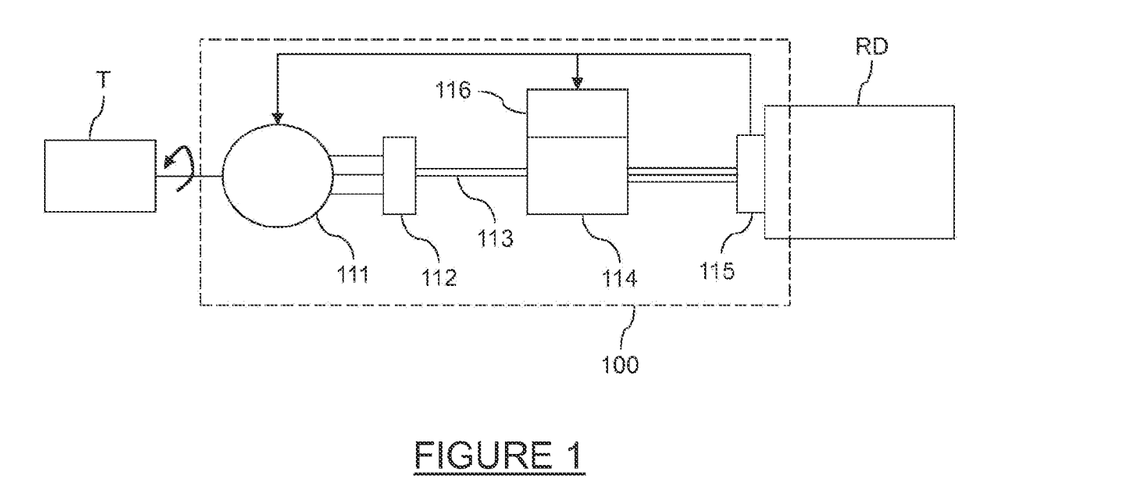
FIG. 1 is a schematic representation of an electric power generation system according to prior art to supply an electrical distribution network of an aircraft.

With reference to FIG. 1, an electric power generation system 100 for a distribution network RD of an aircraft, for example 115V or 230V is represented. The electric power generation system 100 comprises a generator 111 configured to receive mechanical torque from the turbomachine T and provide electric voltage whose frequency is a function of the rotation speed. In order to provide the distribution network with an alternating voltage with constant amplitude and frequency despite variable rotation speed, it is known to use an electric power generation system 100 known by its acronym VSCF for "Variable Speed Constant Frequency". Such an electric power generation system enables constant output amplitude and frequency to be provided despite a variable input (rotation speed of the turbomachine T).

In practice, still with reference to FIG. 1, the electric power generation system 100 comprises:
- a synchronous generator 111 with controlled excitation adapted to receive mechanical torque from a turbomachine T of the aircraft and adapted to generate electric voltage,
- a rectifier 112 placed at the output of the synchronous generator 111,
- an inverter 114 producing a three-phase voltage with a fixed frequency,
- a DC voltage bus 113 connecting rectifier 112 to inverter 114, and
- a point of regulation 115, which is placed at the output of the inverter 114.

In this example, generator 111 operates in synchronous mode after starting and igniting of the turbomachine. Generator 111 has a rotor inductor and stator windings that provide a three-phase alternating voltage. The three-phase alternating voltage is carried as a direct voltage by the voltage bus 113 and then converted back to three-phase alternating voltage by the inverter 114 to be provided to the point of regulation 115.

In order to provide an output voltage with constant frequency and constant amplitude to the point of regulation 115, the electric power generation system 1 comprises in a known manner an electronic unit 116 comprising two parts. The first part is configured to control generator 111, known to those skilled in the art as a Generator Control Unit (GCU), and the second part is configured to control inverter 114. Such an electronic unit is known, for example, from patent application EP0376728A2.

In practice, the electronic unit 116 varies the excitation DC current in order to control the DC voltage of bus 113.

Figure 2:
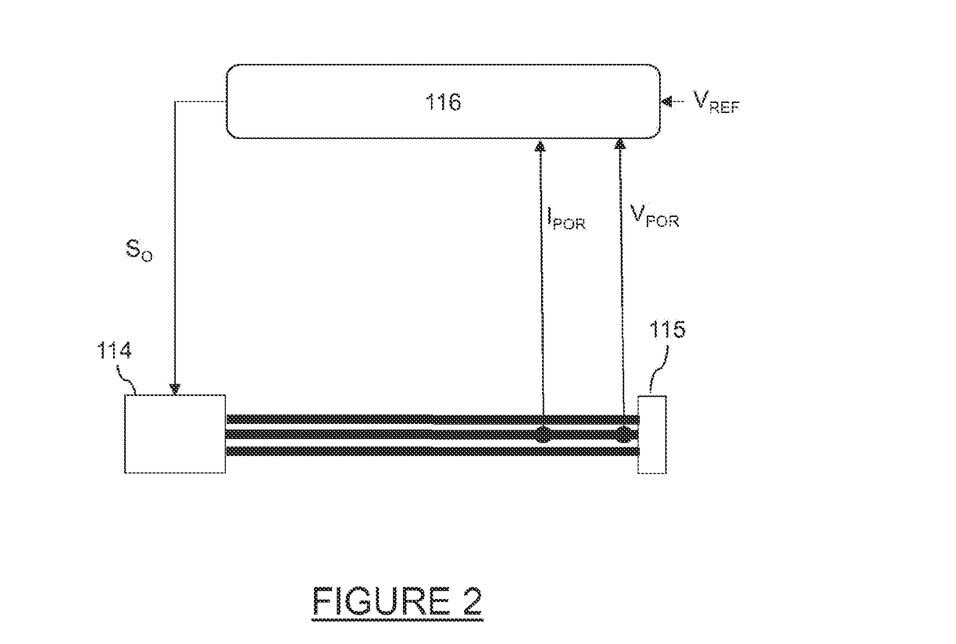
FIG. 2 is a schematic representation of a method for regulating an inverter according to prior art.

In addition, with reference to FIG. 2, the electronic unit 116 measures the value of the output voltages $V_{POR}$ at point of regulation 115 and compares them with the predetermined reference voltages $V_{REF}$ that are expected by point of regulation 115. Similarly, the electronic unit 116 measures the value of the output currents $I_{POR}$ at point of regulation 115 and compares them with predetermined reference currents in order to limit short-circuit currents.

If a deviation occurs, electronic unit 116 modifies the regulation signal SO of inverter 114 so that the inverter adapts the three-phase voltage regulation to a fixed frequency. After receiving the regulation signal SO, the output voltages $V_{POR}$ are close to the reference voltages $V_{REF}$ of the point of regulation 115. In other words, the electronic unit 116 enables the output voltages $V_{POR}$ to be regulated at point of regulation 115 by controlling parameterization of the inverter 114 (switching frequency, conduction time of switches or semiconductors, etc.).

In patent application EP0376728A2, the DC voltage of bus 113 is optimized. However, the amplitude and phase of the output voltage at the point of regulation 115 are not precisely controlled, in particular when the load of the network is unbalanced, as inverter 114 has a constant gain.

In addition, it is known from article "VSCF Aircraft Electric Power System Performance with Active Power Filters" IEEE 978-1-4244-5692-5, a system configured, on the one hand, to adjust gain of the inverter and, on the other hand, to impose a fixed DC voltage provided by the generator. In normal operation, a high DC voltage is required to provide power during overloads or short circuits, resulting in high switching losses in the inverter. These switching losses result in Joule effect heat generation that needs to be dissipated. Also, in a known manner, the power generation system comprises one or more heat dissipation members that are strongly detrimental to the weight of the power generation system. Furthermore, in critical operation, such as during a short-circuit of the power generation system, the generator has to be dimensioned to provide the short-circuit current. Thus, in practice, the generator is overdimensioned as compared to its normal operation, which increases complexity and weight of the power generation system.

In this case, with a high DC voltage, the voltage ripple at the output of the inverter will be higher and will require more filtering, thus an extra weight of the passive LC filtering components that account for up to one third of the inverter weight.

In order to improve regulation of the output voltages, several suggestions have already been provided in prior art. In a particular case, to supply several motors and not an electric network, it has been provided in patent application WO2012123663 to independently regulate the output voltages of the synchronous generator as a function of the rotation speed of the motors. Such a technical solution is not transposable to electrically supply an electric network which has to provide a constant output voltage independent of the loads and their characteristics.

Incidentally, a VSCF power generation system is known from patent application U.S. Pat. No. 4,937,723A in which the inverter and the generator are independently regulated from different variables. In particular, the generator is only regulated based on voltage measurements.

The purpose of the invention is therefore to overcome these drawbacks by providing a new method for regulating an electric power generation system in order to improve control accuracy and optimize weight of the dissipation and filtering means of the inverter as well as weight of the generator.

SUMMARY

To that end, the invention relates to a method for regulating an electric power generation system for an electrical distribution network of an aircraft, the electric power generation system comprising:
- a synchronous generator with controlled excitation adapted to receive mechanical torque from a turbomachine of the aircraft and adapted to generate an electric voltage at several phases,
- a rectifier placed at the output of the synchronous generator,
- an inverter producing a voltage at several phases with a fixed frequency,
- a DC voltage bus connecting the rectifier to the inverter,
- a point of regulation placed at the output of the inverter in order to provide a voltage with constant frequency and amplitude to the distribution network which regulation method comprises:
  i. a correction step in which an output voltage $V_{POR}$ at the point of regulation is compared with a predetermined reference voltage $V_{REF}$ of the distribution network and an output current $I_{POR}$ at the point of regulation is compared with a predetermined reference current $I_{REF}$ of the distribution network so as to determine at least one correction quantity GC,
  ii. a step of determining a regulation signal So of the inverter from the correction quantity GC determined,
  iii. a step of determining a regulation signal $S_G$ of the generator from the correction quantity GC determined and
  iv. a step of transmitting the regulation signals So, $S_G$ to the inverter and generator respectively.

By virtue of the invention, the generator is regulated using the correction quantity, determined by the voltage control loop and the current control loop, used to determine a regulation signal from the inverter. Such regulation is particularly advantageous since the correction quantity forms an image of the parameters of the load as seen by the generator, thus optimizing the bus DC voltage and thus reducing losses. Advantageously, regulation of the generator is thereby performed using data voltage and current control loops of the inverter.

Advantageously, a better accuracy is achieved by virtue of controlling the phase voltages of the inverter. In addition, the weight of the dissipation and filtering means of the inverter is optimized due to the control of the DC voltage supplied by the generator.

Preferably, the regulation signal $S_G$ of the generator is in the form of an excitation current of the generator. Thus, induction effects are modified in the generator to adapt the bus voltage.

Preferably, the correction quantity is determined as a function of the output current $I_{POR}$ at the point of regulation.

Preferably, since the point of regulation comprises three branches, a correction quantity $GC_1$, $GC_2$, $GC_3$ is determined for each of the branches by comparing the output voltage $V_{POR1}$, $V_{POR2}$, $V_{POR3}$ of a determined branch at the point of regulation with a predetermined reference voltage $V_{REF1}$, $V_{REF2}$, $V_{REF3}$ of the distribution network for the determined branch.

One correction quantity per output branch is used to determine a regulation signal SO of the inverter which comprises three components to independently regulate each of the inverter's branches. The inverter regulation is precise, which improves quality of the voltage supplied at the point of regulation.

Preferably, to determine the regulation signal $S_G$ of the generator, the method comprises:
- a step of selecting the maximum correction quantity $GC_{MAX}$ among the correction quantities $GC_1$, $GC_2$, $GC_3$ determined for each of the branches,
- a step of comparing the maximum correction quantity $GC_{MAX}$ with a reference setpoint $GC_{REF}$ in order to determine a deviation $\Delta GC$,
- a step of calculating a raw regulation signal $S_{G1}$ according to the deviation $\Delta GC$ determined and
- a step of determining the regulation signal $S_G$ of the generator according to the raw regulation signal $S_{G1}$.

The selection of the maximum correction quantity $GC_{MAX}$ allows the selection of the most critical case, i.e. the case where the highest setpoint corresponds to the phase supplying the highest load. The reference setpoint $GC_{REF}$ is determined so as to correspond to an optimal setpoint for regulating the inverter while maintaining a sufficient margin to supply the voltage at the point of regulation during transient load variations. Thus, any deviation from this setpoint will cause the generator to be regulated to adapt to the needs of the inverter.

According to one aspect of the invention, the raw regulation signal $S_G$, of the generator is determined by integrating the deviation $\Delta GC$ determined.

According to another aspect of the invention, the regulation signal $S_G$ is restricted as a function of a predetermined short-circuit threshold Si. Such a restriction enables the generator to be protected and prevents a short-circuit current from being generated by the generator. This advantageously enables oversizing of the generator as in prior art to be avoided.

Preferably, to determine the regulation signal $S_G$ of the generator, the method comprises:
- a step of limiting the raw regulation signal $S_G$, according to a reference threshold $UDC_{REF}$ of the bus in order to obtain a limited regulation signal $S_{G2}$,
- a step of comparing a limited regulation signal $S_{G2}$, with a measurement of the voltage $UDC_t$ of the bus in order to determine a deviation $\Delta UDC$,
- a step of calculating a refined regulation signal $S_{G3}$ according to the deviation $\Delta UDC$ determined and
- a step of determining the regulation signal $S_G$ of the generator according to the refined regulation signal $S_{G3}$.

The use of the reference threshold $UDC_{REF}$ allows the generator and, consequently, the bus voltage to be limited in a parameterizable way. The bus voltage is thus limited as low as possible according to requirements in order to limit the switching losses in the inverter in the event of a short circuit or overcurrent on the electric network. The inverter can then have a reduced weight, as it requires less heat dissipation means. Such a reference threshold enables the power and thus the failure of a component in case of overload to be limited.

Preferably, the of reference threshold $UDC_{REF}$ the voltage bus is determined according to the state of the inverter, in particular the maximum current of the inverter. Preferably, the reference threshold $UDC_{REF}$ of the voltage bus is determined dynamically. According to a preferred aspect, the reference threshold $UDC_{REF}$ is defined by the following formula:

$$UDC_{REF} = \frac{2 \times \sqrt{2}}{3} \times \frac{S}{I} \times \frac{1}{\text{Ref\_cons}} + \varepsilon$$

in which

S is the maximum apparent power of the power generation system

I is the maximum rms current measured in the inverter

ε is the voltage drop in the inverter.

Such a reference threshold allows limitation of the regulation signal SG of the generator to be precisely and responsively parameterized.

According to one aspect of the invention, direct, indirect and homopolar coordinates of currents and voltages from Clark, Park or Fortescue transforms are used in the regulation method.

The invention also relates to an electric power generation system for an electrical distribution network of an aircraft, the electric power generation system comprising:

- a synchronous generator with controlled excitation adapted to receive mechanical torque from a turbomachine of the aircraft and adapted to generate electric voltage at several phases,
- a rectifier placed at the output of the synchronous generator,
- an inverter producing a voltage at several phases with a fixed frequency,
- a DC voltage bus connecting the rectifier to the inverter,
- a point of regulation placed at the output of the inverter in order to provide a voltage with constant frequency and amplitude to the distribution network, and
- an electronic regulation unit, connecting the point of regulation to the inverter and the generator, the electronic regulation unit comprising:
  i. a correction module configured to compare an output voltage $V_{POR}$ at the point of regulation with a reference voltage $V_{REF}$ of the distribution network and to compare an output current $I_{POR}$ at the point of regulation is compared with a predetermined reference current $I_{REF}$ of the distribution network so as to determine at least one correction quantity GC,
  ii. a first module for determining a regulation signal So of the inverter from the correction quantity GC determined and
  iii. a second module for determining a regulation signal $S_G$ of the generator from the correction quantity GC determined.

BRIEF DESCRIPTION OF THE DRAWINGS

The invention will be better understood upon reading the following description, given only by way of example, and referring to the appended drawings in which.

It should be noted that the figures set out the invention in a detailed manner in order to implement the invention, said figures can of course be used to better define the invention if necessary.

DETAILED DESCRIPTION

An electric power generation system 1 for an electrical distribution network DN of an aircraft, for example 115V or 230V, as well as a method for regulating said electric power generation system 1 will now be set forth. In this example, the aircraft comprises one or more turbomachines T taking part in the propulsion of the aircraft.

Figure 3:
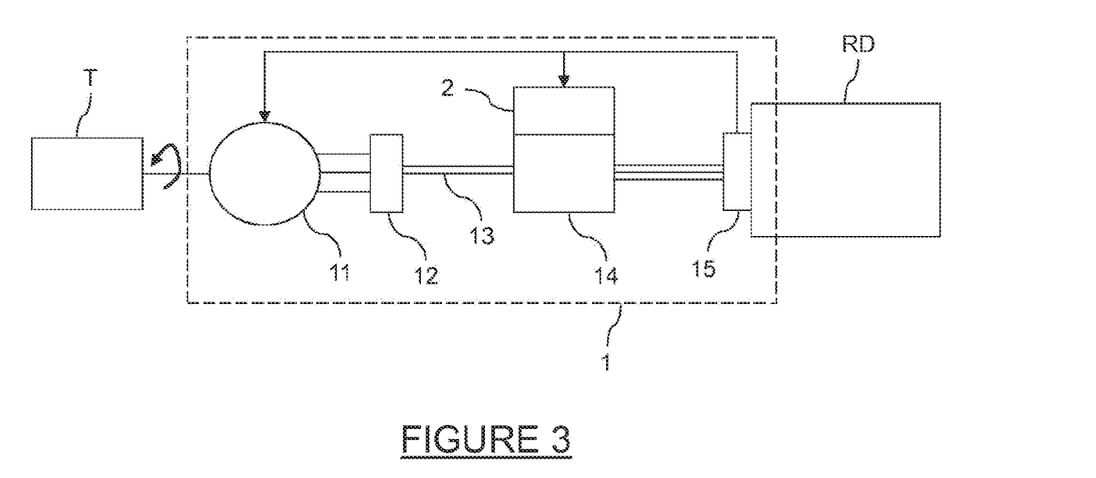
FIG. 3 is a schematic representation of an electric power generation system according to the invention for supplying an electrical distribution network of an aircraft.

With reference to FIG. 3, the electric power generation system 1 comprises:

- a synchronous generator 11 adapted to receive mechanical torque from a turbomachine T of the aircraft and adapted to generate an electric voltage,
- a rectifier 12 placed at the output of the synchronous generator 11,
- an inverter 14 producing a three-phase voltage with a fixed frequency
- a DC voltage bus 13 connecting rectifier 12 to inverter 14, and
- a point of regulation 15, known to those skilled in the art as POR, which is placed at the output of the inverter 14.

The point of regulation 15 serves as a reference in regulating the electrical distribution network RD. The reference voltages and currents are measured in a known way at point of regulation 15.

The synchronous generator 11 is adapted to receive mechanical torque from a turbomachine T of the aircraft and is adapted to generate a three-phase electric voltage. In other words, the synchronous generator 11 comprises three output branches each providing an alternating voltage according to the mechanical torque input from the turbomachine T. It goes without saying that the invention also applies to a voltage distributed over more than three phases.

The synchronous generator 11 is adapted to receive as input a regulation signal SG, here an excitation current, in order to adapt the three-phase output voltage. Synchronous generator 11 is a so-called "controlled excitation" generator. In a known manner, such an excitation current allows the parameters for converting mechanical energy into electric energy to be changed. When the synchronous generator 11 is in the form of a coiled synchronous generator, the excitation current allows induction ratios in the synchronous generator 11 to be changed in order to adjust amplitude of the output voltages. The structure of a synchronous generator 11 is known to those skilled in the art and will not be detailed in what follows.

The rectifier 12 enables a three-phase alternating voltage to be converted into a direct voltage. In other words, rectifier 12 comprises three input branches in order to provide an output DC voltage. In this embodiment, rectifier 12 is in the form of equipment that is independent of generator 11.

Nevertheless, it goes without saying that rectifier 12 and generator 11 could be integrated into one and the same equipment.

Inverter 14 enables a direct voltage to be converted into a three-phase alternating voltage. In other words, Inverter 14 comprises three output branches, each of which provides an AC voltage depending on the input DC voltage. As is well known, inverter 14 comprises LC-type filtering means at its output, the weight of which can account for up to one third of the weight of inverter 14. It goes without saying that the invention also applies to a voltage distributed over more than three phases.

Inverter 14 is adapted to receive as input a regulation signal So in order to adapt the three-phase output voltage. In a known manner, such a regulation signal So allows the DC voltage to AC voltage conversion parameters to be changed. By way of example, when the inverter 14 comprises a plurality of transistors, the control signal So enables the switching duty cycles of the transistors (frequency, etc.) to be changed in order to adjust especially the amplitude, frequency or phase of the output voltages. The structure of an inverter 14 is known to those skilled in the art and will not be described in detail below.

Preferably, the control signal So is in the form of a pulse width modulation signal, better known as "PWM". Depending on the received pulses, the behavior of the inverter 14 can be advantageously modified.

The DC voltage bus 13, or DC (for "Direct Current") bus, makes it possible to connect the rectifier 12 to the inverter 14 using only two electric cables instead of three if each phase of the voltage was independently conducted. The use of a bus 13 is particularly advantageous in the aeronautical context, since the rectifier 12 is located close to a turbomachine T mounted under an aircraft wing, while the inverter 14 is located in the cockpit close to the distribution network RD to be supplied. Since the length and cross-section area are large, limiting the number of electrical cables reduces weight and cost.

Figure 4:
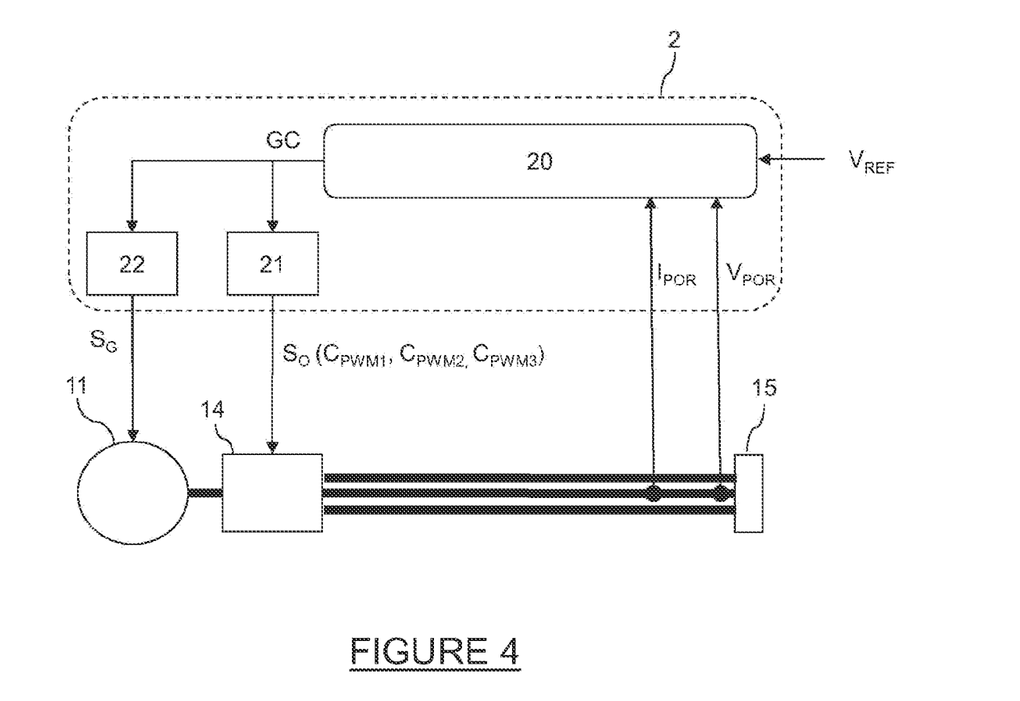
FIG. 4 is a schematic representation of a method for regulating an electric power generation system according to the invention.

With reference to FIGS. 3 and 4, the electric power generation system 1 comprises an electronic regulation unit 2, connecting point of regulation 15 to inverter 14 and generator 11. As illustrated in FIG. 4, the electronic regulation unit 2 comprises:
- a correction module 20 configured to compare an output voltage $V_{POR}$ at point of regulation 15 with a reference voltage $V_{REF}$ of the distribution network RD to determine at least one correction quantity GC,
- a first module 21 for determining a regulation signal So of the inverter 14 according to the determined correction quantity GC and
- a second module 22 for determinating a regulation signal $S_G$ of generator 11 according to the determined correction quantity GC.

In other words, as opposed to prior art, the regulation of inverter 14 and generator 11 are based on the same correction quantity GC determined by the voltage regulation loop and the current regulation loop of inverter 14.

Figure 5:
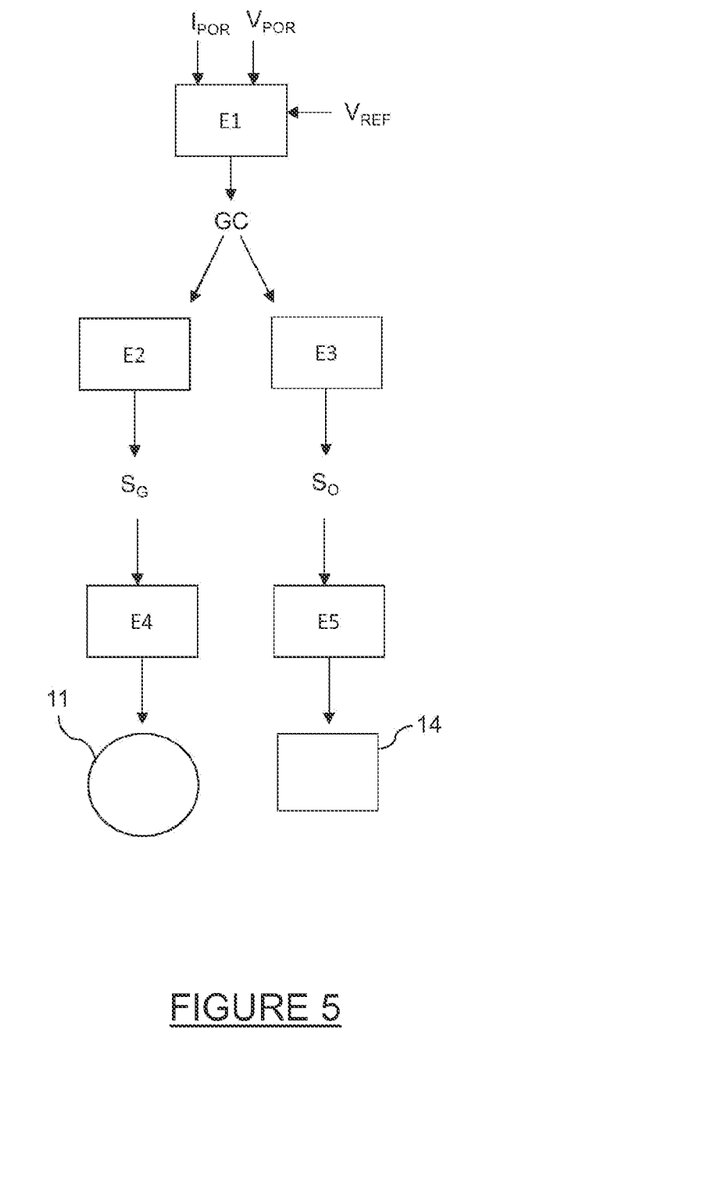
FIG. 5 is a schematic representation of the steps in the method of regulating an electric power generation system according to the invention.

Several examples of implementation of a method for regulating the electric power generation system 1 according to the invention so as to provide electric voltages that are substantially equal to the reference electric voltages expected by the distribution network RD at the output of the point of regulation 15 will now be set forth. The electronic regulation unit 2 makes it possible to implement the regulation method, the steps of which are illustrated in FIG. 5.

Figure 6:
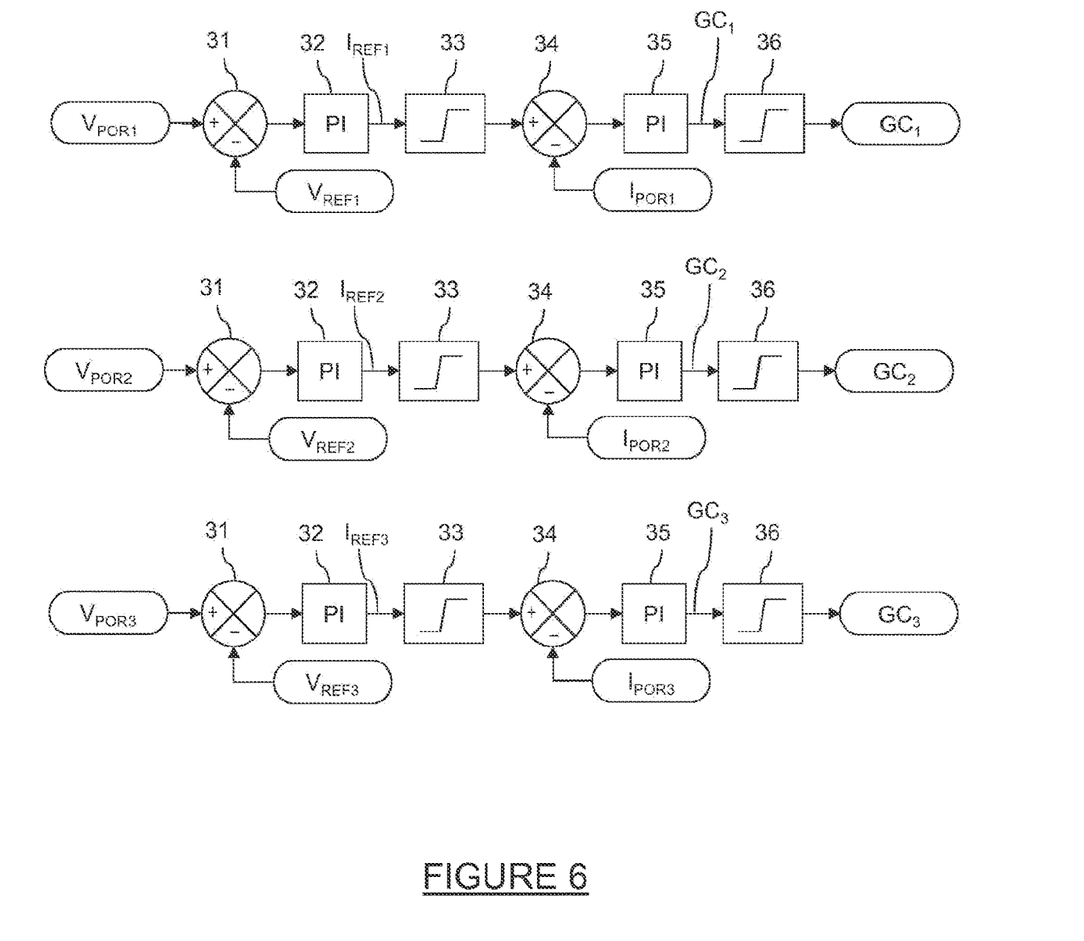
FIG. 6 is a schematic representation of a method for regulating each of the inverter branches in the generation system.

With reference to FIG. 6, the regulation method comprises a step 14 of controlling the inverter in which, for each input branch, the voltage at the point of regulation $V_{POR1}$, $V_{POR2}$, $V_{POR3}$ is compared, by a summer 31, with a predetermined reference voltage $V_{REF1}$, $V_{REF2}$, $V_{REF3}$ in order to determine a deviation which is integrated by a proportional integral corrector (PI corrector) 32 to determine a current setpoint $I_{REF1}$, $I_{REF2}$, $I_{REF3}$.

It goes without saying that another type of corrector could be used instead of the integrator 32. Such a replacement is applicable in a similar manner to the other correctors that will be set forth later. Preferably, the above correction principle is based on instant voltage and current values. The implementation of Park/Clarke or Fortescue type transforms advantageously allows regulation on DC values resulting from these transforms to be carried out.

Preferably, the reference voltage $V_{REF1}$, $V_{REF2}$, $V_{REF3}$ of each input branch is determined according to the distribution network RD. In this example, the distribution network RD is a 115 Vrms phase/neutral voltage network with a frequency of 400 Hz.

In this example, still with reference to FIG. 6, the current setpoint $I_{REF1}$, $I_{REF2}$, $I_{REF3}$ is limited, by a limiter 33, so that the current setpoint $I_{REF1}$, $I_{REF2}$, $I_{REF3}$ does not exceed a predetermined short-circuit threshold and protects the inverter 14. Such a limitation is advantageous but remains optional.

The current setpoint $I_{REF1}$, $I_{REF2}$, $I_{REF3}$ is then compared with the current at the point of regulation $I_{POR1}$, $I_{POR2}$, $I_{POR3}$, by a summer 34 in order to determine a deviation which is integrated by a proportional integral corrector (PI corrector) 35 to determine a correction quantity $GC_1$, $GC_2$, $GC_3$. Another type of corrector could be used instead of the proportional integral corrector 35.

In other words, the correction quantity $GC_1$, $GC_2$, $GC_3$ is obtained from a current loop and a voltage loop in a first correction step µl.

In this example, still with reference to FIG. 6, the correction quantity $GC_1$, $GC_2$, $GC_3$ is limited by a limiter 36, so that the correction quantity $GC_1$, $GC_2$, $GC_3$ does not exceed a predetermined correction threshold. Such a limitation is advantageous but remains optional. The correction quantities $GC_1$, $GC_2$, $GC_3$ are obtained by the correction module 20 of the electronic regulation unit 2, which implements the correction step µl.

With reference to FIG. 4, for each branch of inverter 14, the correction quantities $GC_1$, $GC_2$, $GC_3$ are converted by the first determination module 21 into a control parameter $C_{PWM1}$, $C_{PWM2}$, $C_{PWM3}$ in order to form a PWM regulation signal So which is transmitted to inverter 14 in a transmission step E5. Each control parameter $C_{PWM1}$, $C_{PWM2}$, $C_{PWM3}$ enables one branch of inverter 14 to be precisely regulated. By virtue of this regulation, Inverter 14 will change its parameterization in order to provide, for each branch, a voltage at the point of regulation $V_{POR1}$, $V_{POR2}$, $V_{POR3}$ approximately equal to the reference voltage $V_{REF1}$, $V_{REF2}$, $V_{REF3}$ expected by the distribution network RD. This regulation is autonomous. Thus, the first determination module 21 implements a step 21 of determining a regulation signal So.

In accordance with the invention, in order to improve the regulation, the regulation method also implements a step of regulating the generator 11 according to the control of the inverter 14. In other words, the control of generator 11 and the control of inverter 14 are carried out synergistically, as will be shown in the various examples of implementation.

Figure 7:
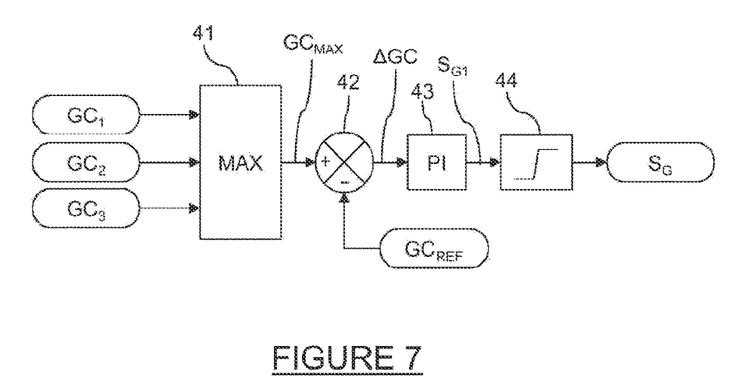
FIG. 7 is a schematic representation of a method for regulating the generator of the generation system according to a first example of implementation.

With reference to FIG. 7, the regulation method comprises a step of controlling the generator 11 in which the maximum correction quantity $G_{CMAX}$ is selected, by a selector 41, from the set of control quantities $GC_1$, $GC_2$, $GC_3$ determined for the branches of inverter 14. This maximum correction quantity $GC_{MAX}$ represents the control requirement in a relevant manner and is relevant for forming the regulation signal $S_G$ of the generator 11.

The maximum correction quantity $GC_{MAX}$ is then compared by a summer 42 with a reference setpoint $GC_{REF}$ in order to determine a deviation $\Delta GC$ which is integrated by a PI corrector 43 to determine a raw regulation signal $S_{G1}$ which is equal, in this example of implementation, to the regulation signal $S_G$ for controlling the operation of generator 11. As set forth previously, another type of corrector could be used instead of the integrator 43.

Preferably, the reference control setpoint $GC_{REF}$ is determined so that it corresponds to an optimal setpoint for regulating the inverter 14. In other words, this reference setpoint varies according to the load of inverter 14. Thus, in the event of a short circuit or zero load, the regulation of generator 11 is adapted to take into account load variations seen by inverter 14. The use of such a $GC_{REF}$ reference control setpoint allows the bus voltage 13 to be regulated to an optimal value for the operation of inverter 14, which both reduces switching losses and limits the weight of the filtering means of inverter 14, which can account for up to one third of the weight of inverter 14.

By way of an example, if the maximum correction quantity $GC_{MAX}$ is greater than the reference setpoint $GC_{REF}$, the regulation signal $S_G$ increases the excitation current of generator 11, which increases the voltage of the voltage bus 13. In order to obtain a voltage at the point of regulation $V_{POR1}$, $V_{POR2}$, $V_{POR3}$ approximately equal to the reference voltage $V_{REF1}$, $V_{REF2}$, $V_{REF3}$, the regulation signal So of the inverter 14 is thereby reduced, which decreases the value of the correction quantities $GC_1$, $GC_2$, $GC_3$ and, consequently, the maximum correction quantity $G_{CMAX}$ The DC voltage regulation by generator 11 allows inverter 14 to be operated at its optimum operating point in order to limit losses and weight of the LC filter it comprises at the output.

In this example, still with reference to FIG. 7, the regulation signal $S_G$ is limited, by a limiter 44, so that the regulation signal $S_G$ does not exceed a predetermined threshold. Such a limitation is advantageous but remains optional.

As illustrated in FIG. 4, the regulation signal SG is determined by the second determination module 22 of the electronic regulation unit 2. Thus, the second determination module 22 implements a step E3 of determining the regulation signal $S_G$. The regulation signal $S_G$ is then transmitted to generator 11 during a transmission step E4.

Figure 8:
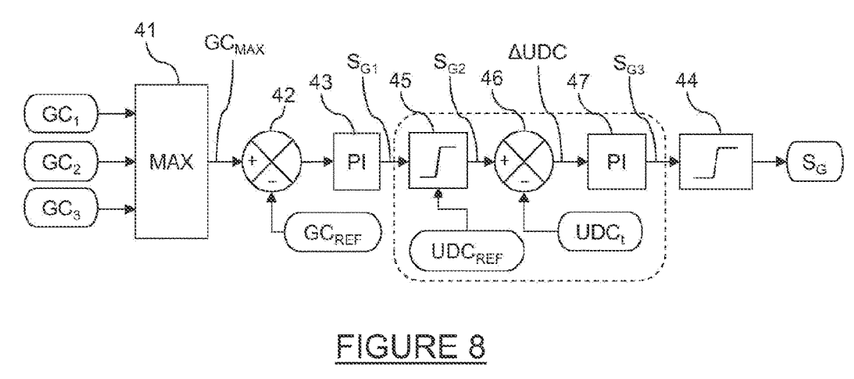
FIG. 8 is a schematic representation of a method for regulating the generator of the generation system according to a second example of implementation and FIG. 9 is a schematic representation of a method for regulating the generator of the generation system according to a third example of implementation.

With reference to FIG. 8, the regulation method comprises additional steps which are located in a dashed line frame in FIG. 8. For the sake of clarity and brevity, the steps set forth in the first implementation of FIG. 7 are not set forth again. Only the differences between the first implementation of FIG. 7 and the second implementation of FIG. 8 are set forth in detail.

In this second example of implementation, the raw regulation signal $S_{G1}$ undergoes processing steps in order to improve its relevancy in regulating the generator 11. As illustrated in FIG. 8, the raw regulation signal $S_{G1}$ is limited, by a parameterizable limiter 45, in order to obtain a limited regulation signal $S_{G2}$ for limiting the voltage in the switching bus 13, which protects the inverter 14 in case of a short circuit at the maximum power of the generating system. The parameterizable limiter 45 is a function of a reference threshold $UDC_{REF}$ in order to obtain the limited regulation signal $S_{G2}$.

The parameterizable limiter 45 is used to protect inverter 14 according to the dynamic state of inverter 14. It enables voltage to be limited in case of overload in order to limit the power taken from the turbomachine T and losses of inverter 14 to be limited. In other words, the parameterizable limiter makes it possible to define the maximum voltage for the maximum permissible power. Preferably, the reference threshold $UDC_{REF}$ is defined by the following formula:

$$UDC_{REF} = \frac{2 \times \sqrt{2}}{3} \times \frac{S}{l} \times \frac{1}{\text{Ref\_cons}} + \varepsilon$$

where
S is the maximum apparent power of the power generation system
I is the maximum current measured in the inverter 14
E is the voltage drop in inverter 14 and is determined according to the characteristics of inverter 14.

The parameterizable limiter enables the raw regulation signal SG1 to be restricted to the reference threshold $UDC_{REF}$. Thus, the maximum apparent power at the output of the inverter will be limited to the value S by limiting the output voltage through the transfer function of inverter 14, regardless of the impedance of the overload or short circuit. The power provided by generator 11 will also be limited, especially as the power factor in case of overload or short circuit is far from 1.

By virtue of this reference threshold $UDC_{REF}$, the voltage of voltage bus 13 is optimal for "normal" loads, while at the same time limiting the power of inverter 14 in the event of overload and short circuit. Incidentally, such a reference threshold $UDC_{REF}$ also makes it possible to limit overvoltage at the point of regulation 15 as a result of an overload or short circuit being ON.

The reference threshold $UDC_{REF}$ varies as a function of the load seen by the bus 13. Thus, in case of a short circuit or zero load, the regulation of generator 11 is adapted to take into account the load variations seen by the bus 13. Furthermore, it is possible to avoid providing a short circuit current by generator 11.

Still with reference to FIG. 8, the method comprises a step of comparing the limited regulation signal $S_{G2}$, with the current voltage UDCt of the voltage bus 13 in order to determine a deviation $\Delta UDC$ which is integrated, by a PI 47 corrector, to determine a refined regulation signal $S_{G3}$ which is equal, in this example of implementation, to the regulation signal $S_G$ allowing operation of generator 11 to be controlled. Another corrector could be used instead of the integrator 47.

Advantageously, by controlling the regulation signal SG, that is the excitation current of generator 11, alternating voltages and currents are limited in case of overload, since generator 11 is advantageously restricted. This advantageously avoids generating a high voltage in the voltage bus 13.

Thus, by virtue of the invention, under normal load of the DC voltage bus 13, that is when the voltage demands of the inverter 14 are normal, the voltage in the voltage bus 13 is reduced, thus limiting switching losses and, consequently, heat build-up. In the event of an overload below the value S or load unbalance, the bus voltage 13 will increase but remain optimal to provide the desired voltage at the point of regulation 15, and the bus voltage 13 will decrease in the event of a short circuit in order to limit the apparent output power of inverter 14.

Advantageously, due to the improved regulation, inverter 14 and generator 11 can have simpler, less bulky and complex structures. No oversizing of generator 11 is necessary.

Figure 9:
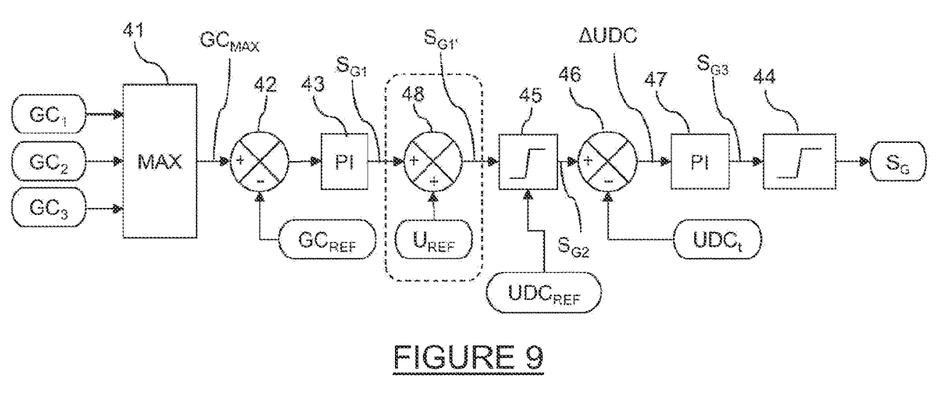

With reference to FIG. 9, the regulation method comprises additional steps that are located in a dashed line frame in FIG. 9. For the sake of clarity and brevity, the steps set forth in the second implementation of FIG. 8 are not set forth again. Only the differences between the second implementation of FIG. 8 and the third implementation of FIG. 9 are set forth in detail.

In this third example of implementation, at the output of integrator 43, an additional signal UREF is added to the raw regulation signal $S_{G1}$, by an adder 48, in order to vary its value by a predetermined value. Such an addition is advantageous since it allows the value of the raw regulation signal $S_{G1}$ to be changed conveniently, especially during the start-up and self-test phases. In addition, the operating points of the power generation system 1 can be further tested in a practical way.

By virtue of the invention, the output voltage of inverter 14 and the output voltage of generator 11 are better controlled. The DC voltage of bus 13 is advantageously lower as compared to prior art, which limits electrical losses in Inverter 14, limits the weight of the LC filter of Inverter 14 and reduces heat generation. The power generation system 1 can then comprise fewer or smaller heat dissipators, which significantly reduces the weight of the power generation system 1.

Further, by virtue of the regulation, it is no longer necessary to oversize generator 11 such that the latter provides a short-circuit current. The weight and space requirement of generator 11 are thereby reduced as compared to prior art.

A generation system for a generator integrating a rectifier has been set forth, but it goes without saying that the invention applies more generally to any controllable direct voltage source.

The invention claimed is:

1. A method for regulating an electric power generation system for an electrical distribution network of an aircraft, the electric power generation system comprising:
    a synchronous generator with controlled excitation adapted to receive mechanical torque from a turbomachine of the aircraft and adapted to generate an electric voltage at several phases,
    a rectifier placed at the output of the synchronous generator,
    an inverter producing a voltage at several phases at a fixed frequency,
    a DC voltage bus connecting the rectifier to the inverter,
    a point of regulation placed at the output of the inverter in order to supply a voltage with constant frequency and amplitude to the distribution network
    which regulation method comprises:
      i. a correction step in which an output voltage $V_{POR}$ at the point of regulation is compared with a predetermined reference voltage $V_{REF}$ of the distribution network and an output current $I_{POR}$ at the point of regulation is compared with a predetermined reference current $I_{REF}$ of the distribution network so as to determine at least one correction quantity GC,
      ii. a step of determining a regulation signal So of the inverter from the correction quantity GC determined,
      iii. a step of determining a regulation signal $S_G$ of the generator from the correction quantity GC determined and
      iv. a step of transmitting the regulation signals So, $S_G$ to the inverter and the generator respectively.

2. The regulation method according to claim 1 wherein the regulation signal $S_G$ of the generator is in the form of an excitation current of the generator.

3. The regulation method according to claim 1, wherein, since the point of regulation comprises three branches, a correction quantity $GC_1$, $GC_2$, $GC_3$ is determined for each of the branches by comparing the output voltage $V_{POR1}$, $V_{POR2}$, $V_{POR3}$ of a given branch at the point of regulation with a predetermined reference voltage $V_{REF1}$, $V_{REF2}$, $V_{REF3}$ of the distribution network for the determined branch.

4. The regulation method according to claim 3 wherein, for determining the regulation signal $S_G$ of the generator, the method comprises:
    a step of selecting the maximum correction quantity $GC_{MAX}$ from the correction quantities $GC_1$, $GC_2$, $GC_3$ determined for each of the branches,
    a step of comparing the maximum correction quantity $GC_{MAX}$ with a reference setpoint $GC_{REF}$ to determine a deviation $\Delta GC$,
    a step of calculating a raw regulation signal $S_{G1}$ according to the deviation $\Delta GC$ determined and
    a step for determining the regulation signal $S_G$ of the generator according to the raw regulation signal $SG_1$.

5. The regulation method according to claim 4 wherein, for determining the regulation signal $S_G$ of the generator, the method comprises:
    a step of limiting the raw regulation signal $S_{G1}$ according to a reference threshold $UDC_{REF}$ of the voltage bus in order to obtain a limited regulation signal $S_{G2}$,
    a step of comparing a limited regulation signal $S_{G2}$ with a measurement of the voltage UDCt of the voltage bus to determine a deviation $\Delta UDC$,
    a step of calculating a refined regulation signal $S_{G3}$ according to the deviation $\Delta UDC$ determined, and
    a step of determining the regulation signal $S_G$ of the generator according to the refined regulation signal $S_{G3}$.

6. The regulation method according to claim 5, wherein the reference threshold $UDC_{REF}$ of the voltage bus is determined according to the state of the inverter, in particular the maximum current of the inverter.

7. The regulation method according to claim 6, wherein the reference threshold $UDC_{REF}$ of the voltage bus is determined dynamically.

8. The regulation method according to claim 5, wherein the reference threshold $UDC_{REF}$ is defined by the following formula:

$$UDC_{REF} = \frac{2 \times \sqrt{2}}{3} \times \frac{S}{I} \times \frac{1}{\text{Ref\_cons}} + \varepsilon$$

in which
    S is the maximum apparent power of the power generation system
    I is the maximum rms current measured in the inverter
    $\varepsilon$ is the voltage drop in the inverter.

9. An electric power generation system for an electrical distribution network of an aircraft, the electric power generation system comprising:
    a synchronous generator with controlled excitation adapted to receive mechanical torque from a turbomachine of the aircraft and adapted to generate an electric voltage at several phases, a rectifier placed at the output of the synchronous generator, an inverter producing a voltage at several phases with a fixed frequency, a DC voltage bus connecting the rectifier to the inverter, a point of regulation placed at the output of the inverter in order to provide a voltage with constant frequency and amplitude to the distribution network, and an electronic regulation unit, connecting the point of regulation to the inverter and to the generator, the electronic regulation unit comprising:

i. a correction module configured to compare an output voltage $V_{POR}$ at the point of regulation with a reference voltage $V_{REF}$ of the distribution network and to compare an output current $I_{POR}$ at the point of regulation is compared with a predetermined reference current $T_{REF}$ of the distribution network in order to determine at least one correction quantity $G_C$ ii. a first module for determining a regulation signal So of the inverter from the correction quantity $G_C$ determined and iii. a second module for determining a regulation signal $S_G$ of the generator from the correction quantity $G_C$ determined.

* * * * *